Dec. 19, 1922.
W. STASIAK.
TROLLEY WHEEL GUARD.
FILED APR. 12, 1922.
1,439,648.
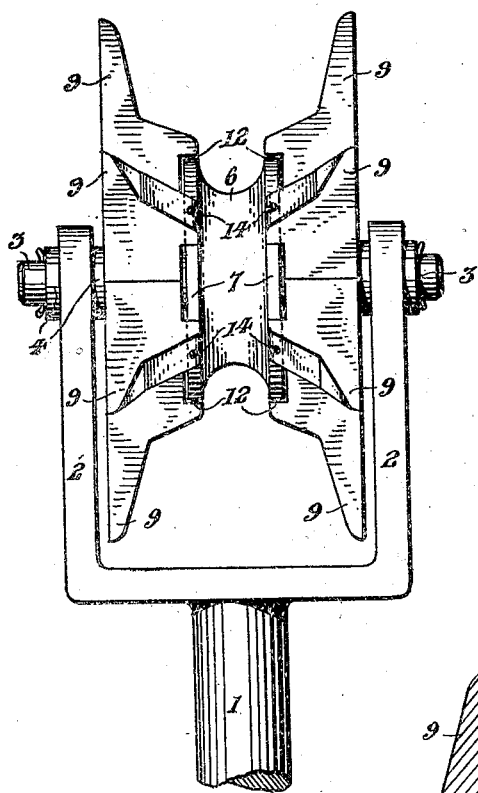
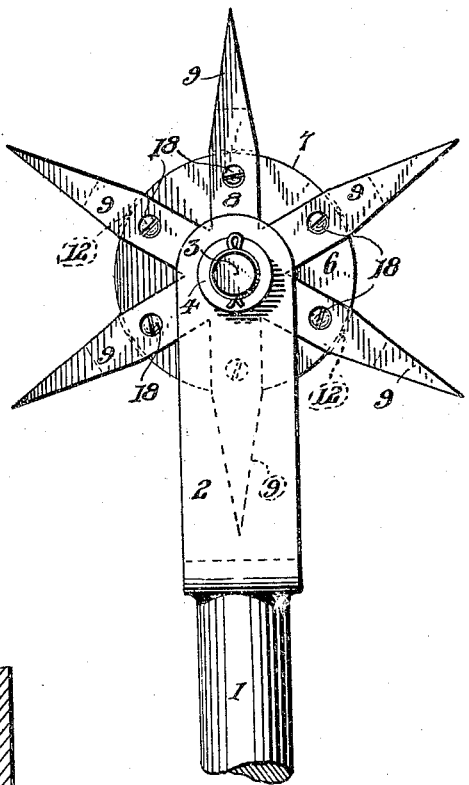
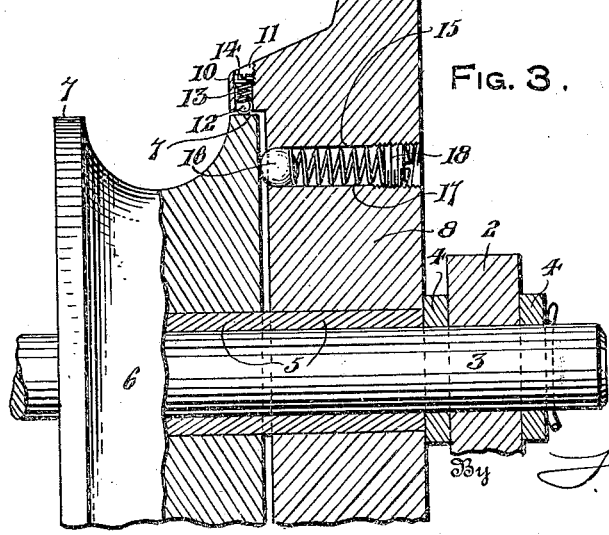
Inventor
W. Stasiak Patented Dec. 19, 1922.

1,439,648

UNITED STATES PATENT OFFICE.

WALENTY STASIAK, OF DETROIT, MICHIGAN.

TROLLEY-WHEEL GUARD.

Application filed April 12, 1922. Serial No. 552,006.

*To all whom it may concern:*

Be it known that I, WALENTY STASIAK, a citizen of the United States of America, residing at Detroit, in the county of Wayne and State of Michigan, have invented certain new and useful Improvements in Trolley-Wheel Guards, of which the following is a specification.

This invention relates to certain new and useful improvements in trolley wheel guards, and has particular reference to a revolubly mounted guard wheel positioned at each side of the trolley wheel to maintain the trolley wheel in engagement with the trolley wire, and to prevent accidental disengagement between the wheels and wire.

The invention further embodies in a trolley wheel guard of the type above set forth, a provision of tensioned antifriction members interposed between the guard wheels and the trolley wheel.

With the above and other objects that will appear as the nature of the invention is better understood, the same consists in the novel construction, combination and arrangement of the parts hereinafter more fully described, illustrated in the accompanying drawings, and pointed out in the appended claims.

In the drawings forming a part of this application and in which like designating characters refer to corresponding parts throughout the several views:—

Figure 1 is a side elevational view of a trolley wheel guard constructed in accordance with the present invention showing the harp of the pole and the star-shaped guard wheel at each side of the trolley wheel having portions overlying the flanged edges of the trolley wheel, Figure 2 is a side elevational view of the device, and Figure 3 is an enlarged detail sectional view of the anti-friction bearing between the trolley wheel and guard wheel.

Referring more in detail to the accompanying drawings, there is illustrated a trolley wheel guard associated with a trolley pole 1 provided upon the upper end thereof with an U-shaped bracket head 2 having a wheel supporting shaft 3 journaled in the ends of the bracket arms of the bracket head, spacing washers 4 being positioned at opposite sides of the arms of the brackets as shown in Figs. 1 and 3, while the shaft is retained in the bracket head by suitable fastening devices such as cotter pins.

As shown in Fig. 3, a bearing sleeve 5 encloses the shaft 3 intermediate the bracket arms 2 and engages at opposite ends, the inwardly positioned washers 4. A trolley wheel having a grooved periphery 6 and side flanges 7 is journaled centrally of the bearing sleeve 4, while a guard wheel 8 is journaled on the bearing sleeve at each side of the trolley wheel, the inwardly positioned washers 4 engaging the outer faces of the guard wheels 8 as shown in Fig. 3, holding the guard wheels properly positioned relative to the trolley wheel.

Each guard wheel is of star shaped formation, each wheel including radial arms 9 and an inwardly directed shoulder 10 overlying the adjacent flange 7 of the trolley wheel, the shoulder 10 being provided with an opening 11 receiving a bearing ball 12 that is spring pressed as at 13 while said spring is confined within the opening by the screw plug 14 threaded in the outer end thereof as clearly shown in Fig. 3 to compensate for friction between the adjacent faces of the trolley wheel and the arms 8. Each arm is provided with a transverse opening 15 receiving a bearing ball 16, and a spring 17 which engages the bearing ball and is confined within the opening by the screw plug 18 entering the threaded outer end of the opening 15.

From the above detailed description of the device, it is believed that the construction and operation thereof will at once be apparent, it being noted that when the trolley wheel is in tracking engagement with a trolley wire, the same may revolve on the shaft 3 independently of the wheels 8, the bearing balls 12 and 16 carried by the radial arms 9 of the guard wheels reducing friction between the trolley and guard wheel. The outer ends of the radial arms 9 extending outwardly of the trolley wheel retain the latter in engagement with a trolley wire, the radial arms preventing accidental disengagement of the trolley wheel relative to the wire, and also assisting in placing the wheel into engagement with the wire.

While there is herein shown and described the preferred embodiment of my invention, it is nevertheless to be understood that various forms, modifications and arrangements of the parts may be made without departing from the spirit and scope of the invention as claimed.

Having thus described the invention, what I claim as new is:

1. In a trolley wheel guard, a head, a shaft therein, a trolley wheel journaled on said shaft, a guard wheel journaled on said shaft at each side of the trolley wheel, each guard wheel including a plurality of radial arms, a shoulder carried by each arm overlying the adjacent edge of the trolley wheel and spring pressed anti-friction bearing balls carried by the radial arms and arm shoulders engaging the adjacent faces of the trolley wheel.

2. In a trolley wheel guard, a head, a shaft therein, a trolley wheel journaled on said shaft, a guard wheel journaled on said shaft at each side of the trolley wheel, each guard wheel including a plurality of radial arms, a shoulder carried by each arm overlying the adjacent edge of the trolley wheel each arm and shoulder having an opening therein and a spring pressed anti-friction bearing ball disposed in each opening for engagement with the adjacent face of the trolley wheel.

In testimony whereof I affix my signature.

WALENTY STASIAK.